United States Patent [19]
Weiss et al.

[11] 3,863,969
[45] Feb. 4, 1975

[54] VACUUM LIFTER

[75] Inventors: Richard B. Weiss, Lower Burrel, Pa.; D. Marshall Fox, South Barwon, Australia

[73] Assignee: Aluminum Company of America, Pittsburgh, Pa.

[22] Filed: Nov. 1, 1973

[21] Appl. No.: 411,717

[52] U.S. Cl. ............................................ 294/64 R
[51] Int. Cl. ............................................. B66c 1/02
[58] Field of Search ............... 294/64 R, 65; 114/51; 214/650 SG; 248/362, 363; 269/21

[56] References Cited
UNITED STATES PATENTS

| | | | |
|---|---|---|---|
| 740,534 | 10/1903 | Cleathero | 294/64 R |
| 1,101,391 | 6/1914 | Beugler | 294/64 R X |
| 2,871,054 | 1/1959 | Zinke | 294/64 R |
| 2,876,026 | 3/1959 | Mancini | 294/64 R X |
| 3,307,869 | 3/1967 | Warfel | 294/64 R |
| 3,627,369 | 12/1971 | Nixon | 294/64 R |

*Primary Examiner*—James B. Marbert
*Assistant Examiner*—Johnny D. Cherry
*Attorney, Agent, or Firm*—Daniel A. Sullivan, Jr.

[57] ABSTRACT

A vacuum lifter including a cup having a bottom wall and a lip, a sealing ring, means for holding an edge of the sealing ring hermetically against the lip, a plurality of radial segment means arranged free of restraint from one another, and spring means, independent of said radial segment means, for biasing the radial segment means individually in the direction from the bottom wall toward the lip against the sealing ring outside of such edge, the radial segment means distributing force exerted by the spring means uniformly onto the sealing ring, the radial segment means being able to deflect in the direction from the lip toward the bottom wall against the spring means biasing.

9 Claims, 5 Drawing Figures

VACUUM LIFTER

BACKGROUND OF THE INVENTION

The present invention relates to a vacuum lifter which utilizes suction to enable the lifting of objects. More particularly, the present invention relates to such a lifter which is capable of lifting objects which are at temperatures higher than the operational temperatures of previous vacuum lifters.

Vacuum lifters are generally used to handle nonmagnetic material, aluminum sheet and plate being examples. Before the development of the cup of the present invention, no practical cup was available for lifting objects having temperatures above 750°F.

SUMMARY OF THE INVENTION

In view of the above, it is an object of the present invention to provide a vacuum lifter structure capable of operation at temperatures higher than has been practical in the past.

This as well as other objects which will become apparent in the discussion that follows are achieved, according to the present invention, by a vacuum lifter including a cup having a bottom wall and a lip, a sealing ring, means for holding an edge of the sealing ring hermetically against the lip, a plurality of radial segment means arranged free of restraint from one another, and spring means, independent of said radial segment means, individually in the direction from the bottom wall toward the lip against the sealing ring outside of such edge, the radial segment means distributing force exerted by the spring means uniformly onto the sealing ring, the radial segment means being able to deflect in the direction from the lip toward the bottom wall against the spring means biasing.

DESCRIPTION OF THE PREFERRED EMBODIMENTS

Figure 1:
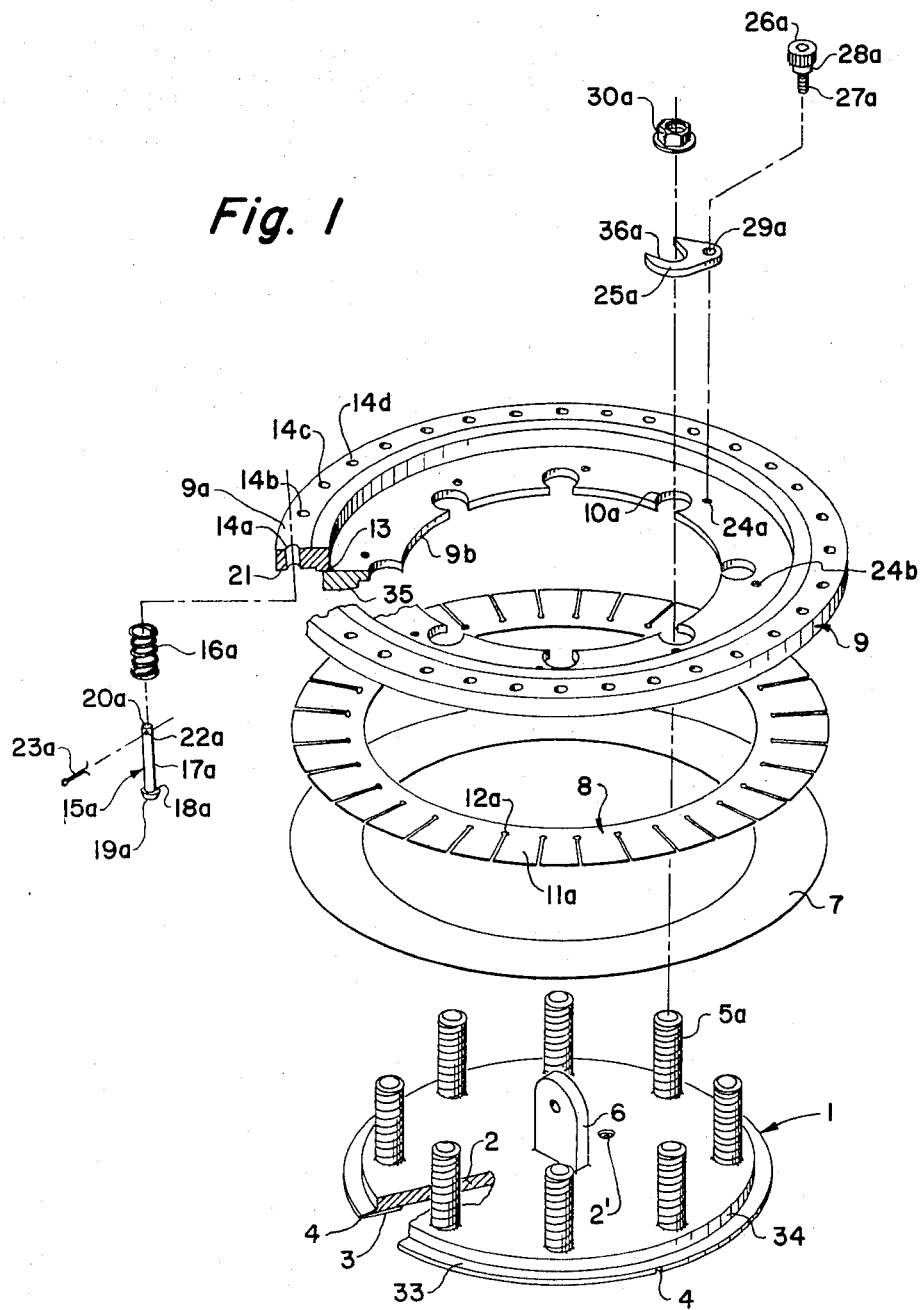
FIG. 1 is an isometric, partially broken away, exploded drawing of a vacuum lifter according to the present invention.
Figure 2:
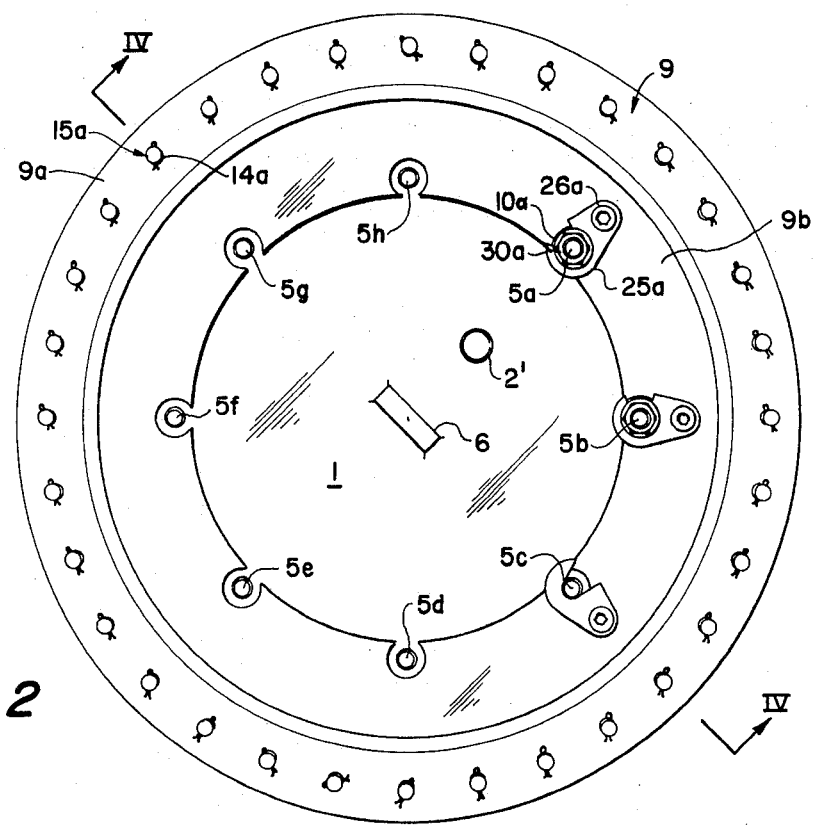
FIG. 2 is a top view of the vacuum lifter of FIG. 1 in assembly.
Figure 3:
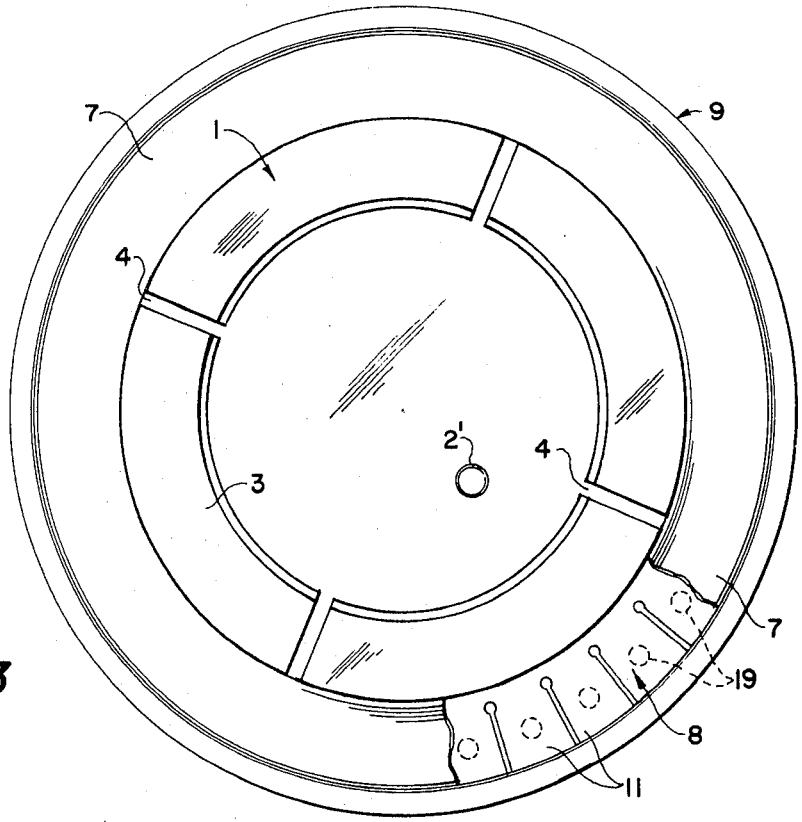
FIG. 3 is a bottom view of the vacuum lifter of FIG. 1 also in assembly, with a portion broken away.

Referring to FIGS. 1 to 4 and particularly to the exploded view of FIG. 1, a vacuum lifter according to a preferred embodiment of the present invention includes an inverted (as shown in the drawing) cup provided in the form of pad plate 1. This pad plate exhibits a cup bottom wall 2 and a cup lip 3. Running through the cup lip are channels 4 to open the cup interior to the outer edge of the lip. Bottom wall 2 is pierced by threaded hole 2', for the attachment of an evacuation line. Threaded clamping studs 5a, etc., eight in number in this particular embodiment, are welded onto the upper surface of bottom wall 2. Likewise welded onto the upper surface of bottom wall 2 is lifting eye 6.

Above the pad plate 1 is sealing ring 7, then backup ring 8, and finally, above the backup ring, a clamp in the form of annular plate 9.

While it is adequate to utilize a flat sealing ring 7, it is preferred to provide backup ring 8 as the frustrum of a conical surface, with the vertex, as located by the intersection of the projected surface elements, lying above the backup ring 8 in FIG. 1. Backup ring 8 is radially slotted, from its outer edge toward its inner continuous edge, into radially directed tongues 11a, etc. The inward ends of the slots terminate in stress-reducing holes 12a, etc.

Annular plate 9 is provided with bores 10a, etc. corresponding in number to the clamping studs. In the particular embodiment illustrated, annular plate 9 is constructed from an upper ring 9a and a lower ring 9b. The upper and lower rings are welded together at location 13.

Annular plate 9 is the foundation of a subassembly of the vacuum lifter. A first part of this subassembly is associated with holes 14a, 14b, 14c, 14d, etc. There are 32 such holes in the illustrated embodiment, although only 30-½ of them are shown, since a part of annular plate 9 has been broken away. Associated with each of these holes in the subassembly is a pressure pin and auxiliary hardware; only the pressure pin 15a, associated with hole 14a, has been illustrated, in order to avoid unnecessary repetition. Pressure pin 15a is easily obtainable on the market in the form of a round-head steel rivet. The pressure pin and auxiliary hardware associated with the other holes are identical to the pressure pin assembly illustrated for hole 14a. In order to place pressure pin 15a into assembly with annular plate 9, helical compression spring 16a is slid onto shank 17a of the pressure pin until it rests on shoulder 18a of head 19a. With spring 16a in place, shank end 20a is inserted into hole 14a from the underside 21 of annular plate 9. When diametral hole 22a comes above the annular plate 9, cotter pin 23a is inserted through it for the purpose of preventing pin 15a from falling out of hole 14a.

Also forming a part of the subassembly based on annular plate 9 are swing C-washers attached using threaded holes 24a, 24b, etc., there being 8 such holes in the illustrated embodiment. Of the C-washers, only the C-washer 25a associated with hole 24a has been illustrated, the remaining 7 C-washers being identical to that illustrated. The assembly of C-washer 25a is accomplished using shoulder screw 26a. The lower end 27a of the shoulder screw is threaded to match the threads in hole 24a. Shoulder 28a is of greater diameter than hole 24a but of lesser diameter than hole 29a in the C-washer. Shoulder 28a is also longer than the thickness of C-washer 25a. Therefore, when shoulder screw 26a has been inserted through hole 29a in C-washer 25a and screwed down into hole 24a, shoulder 28a comes to bear on the upper surface of ring 9b after which the shoulder screw is tight and cannot be rotated any more and yet C-washer 25 a may pivot on shoulder 28a as axis.

Also shown in FIG. 1 is collar nut 30a which is threaded onto clamping stud 5a as will be explained below relative to the assembly of pad plate 1, sealing ring 7, backup ring 8, and annular plate 9 into the vacuum lifter of the present invention. The outer diameter of the collar nuts is less than the inner diameter of bores 10a, etc.

Considering now all of FIGS. 1 through 5, a method of assembling the various parts of the illustrated vacuum lifter together into a single structure unit will be explained. The cup shape of pad plate 1 provides reference directions for locating parts in the assembly. The direction from cup lip 3 to bottom wall 2 is indicated by arrow A, while the opposite direction from the bottom wall 2 to the cup lip 3 is indicated by arrow B.

Figure 4:
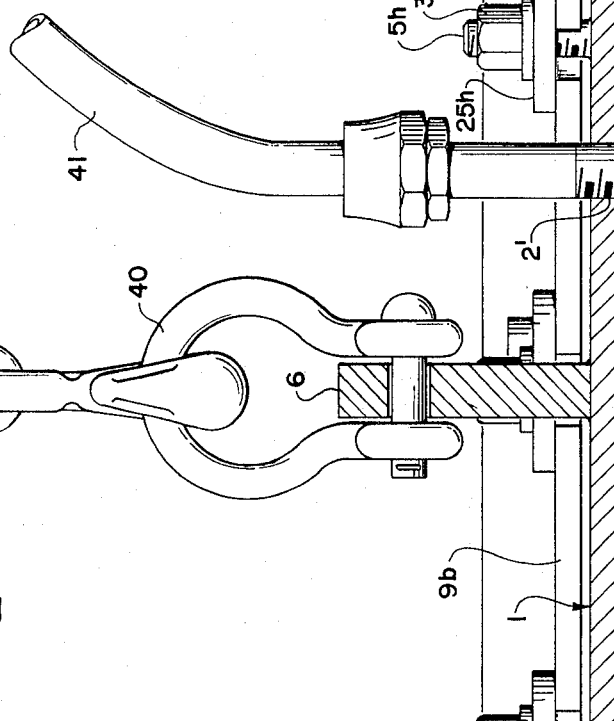
FIG. 4 is an elevational, cross-sectional view taken on the cutting plane IV—IV of FIG. 2.

First, pad plate 1 is laid on a support 31, with cup lip 3 lowermost and bottom wall 2 uppermost, as shown in FIG. 4. This allows the ring assembly 32 of sealing ring 7 and backup ring 8 to depend freely from the pad plate when it is in position on the pad plate.

With pad plate 1 on support 31, sealing ring 7 is let down onto the conical upper surface 33 of lip 3. Backup ring 8 is in turn let down in coincidence onto ring 7 to complete ring assembly 32. Sealing ring 7 then lies in contact with surface 33 of lip 3 at the inner edge of ring assembly 32. This contact is continuous in order to enable a hermetic sealing. Sealing ring 7 lies on the side of the ring assembly 32 facing in the direction B, while backup ring 8 is on the side of the ring assembly facing in the direction A.

Annular plate 9, with the C-washers already attached by the shoulder screws and the pressure pins and springs already held in place by the cotter pins, is next oriented such that its bores 10, etc. are in axial alignment with the clamping studs and then lowered down over shoulder 34 until its conical surface 35 lies in contact with backup ring 8 on the side of the ring assembly 32 facing in the direction of arrow A and at the inner edge of ring assembly 32. Before the lowering of annular plate 9, the position of backup ring 8 is adjusted by revolving it about its axis such that pressure pins 15a, etc. will come to bear on the middles of the radial tongues 11a, etc. when plate 9 is lowered. In the embodiment shown, this adjustment can be carried out, simultaneously with the lowering of ring 8 into position on ring 7, by lining up the center of any one of the tongues with any one of the clamping studs.

Pressure pins 15a, etc., together with springs 16a, etc., plate 9, the clamping studs, C-washers, shoulder screws, and collar nuts, act as a spring means for biasing the radial tongues on the direction of arrow B. With each tongue of the backup ring being backed up by a spring-loaded pressure pin, uniform pressure is applied to the sealing ring as the vacuum lifter is lowered onto the surface of an object to be lifted, and deflection and restoration of the seal and back-up combination is made possible. Besides obtaining uniformity in the loading of the sealing ring due to the multiplicity of pressure pins, the tongues function to distribute the essentially point forces exerted by the individual springs uniformly onto the sealing ring.

After plate 9 has been lowered down over shoulder 34, the C-washers 25a, etc. may be swung toward clamping studs 5a, etc. until the clamping studs are situated at the base of V-shaped slots 36a, etc. Then, collar nuts 30a, etc. are threaded onto studs 5a, etc. and drawn up tight. Plate 9, along with the inner continuous edge of plate 8, the clamping studs, shoulder screws, C-washers, and collar nuts, act as means for holding the inner edge of ring 7 against lip 3. With the collar nuts drawn up tight, a continuous hermetic seal is formed by ring 7 on surface 33. With the vacuum lifter thus assembled, it may be used for lifting an object, for example an aluminum plate 37 at elevated temperature, as illustrated in FIG. 5 and described below.

It will be apparent that later disassembly and assembly does not require retraction of the collar nuts completely off of the clamping studs. Rather, the collar nuts need only be retracted sufficiently to loosen the C-washers to allow them to pivot about the shoulder screws. With the C-washers swung clear of the collar nuts, annular plate 9 may be lifted upwards out of assembly, since the diameter of the collar nuts is less than the diameter of bores 10a, etc.

Figure 5:
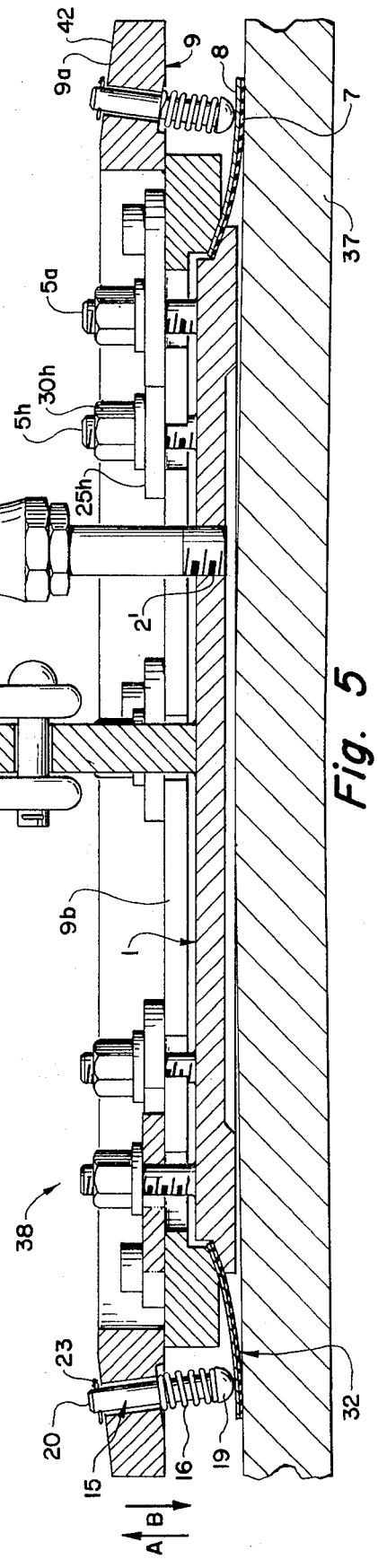
FIG. 5 is a view as in FIG. 4 of the vacuum lifter of FIG. 1 in the act of lifting an aluminum plate.

Referring more specifically now to FIG. 5, to perform a lifting, the vacuum lifter 38 is lowered by chain 39 and clevis 40 down onto an aluminum plate 37 which is to be lifted. Plate 37 has a slight curvature, e.g. a radius of curvature equal to 17.5 meters. The weight of the vacuum lifter itself brings sealing ring 7 with sufficient static force into contact with plate 37 so that the cup interior may be evacuated through line 41 running into hole 2' to obtain a secure attachment of the vacuum lifter to the plate. With evacuation, the ring assembly 32 of sealing ring 7 and backup ring 8 is deflected upwards in the direction of arrow A from the lip 3 toward the bottom wall 2. The pressure pins 15a, etc. are correspondingly moved upwards in the Figure, so that cotter pins 23a, etc. become situated above conical surface 42.

The radial slotting of the backup ring frees the tongues 11a, etc. of restraint from one another to allow for their thermal expansion caused by high temperature in plate 37. If this slotting is not present, the backup ring gets wavy at high temperature, resulting in wrinkling of the sealing ring and accelerating sealing ring deterioration.

It is not necessary to remove chain 39 and line 41, in order to replace an old sealing ring with a new one. Rather, plate 9 is released by loosening the collar nuts and the new sealing ring is simply pulled up in the direction A, from below pad 1, over its lip 3, into position on surface 33.

Further illustrative of the present invention is the following example:

EXAMPLE

Used was a backup ring 8 in the form of a 22-gauge, i.e., 1/32-inch thick, steel sheet having the conicity of surfaces 33 and 35. The conicity was imparted to ring 8 by cold forming in a die. The conicity of ring 8 and surfaces 33 and 35 was characterized in this example by angle alpha (FIG. 4) equals 15°. The radial slotting of the backup ring was created using a 1/16-inch thick saw blade. Holes 12a, etc. had a diameter of 0.187 inch.

Parts 1, 9a, and 9b were, like ring 8, constructed of steel.

Angle beta, the tilt of the pressure pins, was 8°, which is roughly halfway between the original 15° attitude of the backup ring and the final 0° attitude when a plate is being lifted. This compromise is provided for preventing binding of the pressure pins in holes 14a, etc. throughout the range of movement of the backup ring. Conical surface 42 is slanted also at 8°, so that both ends of the cotter pins will bear against it.

Sealing ring 7 was cut from a sheet of Style No. A-56 gasket material, a product of the Raybestos-Manhattan Company of Bridgeport, Connecticut. The sheet thickness was 1/16-inch. A sheet thickness of 1/32-inch was found to give reduced seal life. Sheet thicknesses such as 1/8-inch may require that weight be added to the lifter before vacuum attachment to the object to be lifted can be initiated. Style A-56 gasket material is produced from all spinning grade, long asbestos fiber bonded together by a binder of high heat resistant, non-reverting, synthetic rubber compound which is aging resistant. Analysis of this Style No. A-56 gasket material showed it to consist essentially of 16 weight-percent styrene-butadiene rubber and 84 weight-percent inorganic material, with this 84 percent inorganic material being essentially 4 percent (accurate to a factor of 3) $BaSO_4$, 3 percent (accurate to a factor of 3) ZnO, and 77 percent, i.e., the remainder, asbestos ($3MgO \cdot 2SiO_2 \cdot 2H_2O$). The sheet had a density of 1 ounce per cubic inch, a compression and recovery (as tested at 5,000 psi, 1 minute, ¼ inch diameter foot, and 5 pound preload) of 12 percent ±4 percent compression and a recovery after compression of 40 percent as based on the compressed thickness. The oil resistance of A-56, as measured by percent swell after 5 hours at 300°F, was, with ASTM No. 1 oil, 5 to 15 percent, while, with ASTM No. 3 oil, 30 to 60 percent. The fuel resistance as measured by percent swell after 5 hours at room temperature was, with ASTM fuel A, 10–25 percent while with fuel B, 25–40 percent. The minimum tensile strengths of A-56 as represented by the average of 10 tests is 15,250 psi with the grain, and 5,650 psi across the grain. Flexibility without cracking is characterized in that the sheet can be bent 180° over a rod whose diameter is 4 times the thickness of the sheet, in this instance 4 times 1/16 inch or ¼ inch.

To test this vacuum lifter, an 1,150 pound block of aluminum was machined on an upper surface. The block was heated to between 900° and 1,000°F. Solid lubricant, in the form of graphite lubricant, was applied to the lower surface of sealing ring 7 to prevent sticking to the lifted block. The particular graphite lubricant was a mixture of 19 parts by volume water and 1 part by volume Renite S-28, a product of the Renite Company of Columbus, Ohio. Renite S-28 is a thixotropic, water-base dispersion of graphite particles, with the graphite being present at 20 weight percent and being of size approximately 1 micron. Renite S-28 has a pH of 7.5 and is sulfide free. The vacuum lifter was lowered onto the top of the block. Then a vacuum of approximately 25 inches of mercury measured downwards from atmospheric pressure, i.e., an absolute pressure of 5 inches of mercury or 2-½ pounds per square inch, was drawn by evacuating through line 41. This vacuum was exerted over an area of approximately 250 square inches on the block. The block was then lifted. The block, after being lifted, was lowered again to the floor. The cycle of drawing the vacuum, lifting, lowering and releasing the vacuum was repeated 50 times after which the test was discontinued, since it was apparent that the structure of the present invention was giving high temperature lifting results far superior to that previously obtainable using any other practical vacuum lifter structure. No waviness was found to arise in backup ring 7 during service and this provided continued reliable lifting action.

Under exposure to the temperatures between 900° and 1,000°F, some of the sealing ring binder burns out as evidenced by a strong smell of burning rubber, but the residue of this burning out continued to bond the asbestos fibers together over the course of the 50-cycle test.

Other solid, high temperature lubricants, such as molybdenum disulfide lubricants are alternatives for the graphite-based lubricant of the Example.

It will be understood that the above description of the present invention is susceptible to various modifications, changes, and adaptations and the same are intended to be comprehended within the meaning and range of equivalents of the appended claims.

What is claimed is:

1. A vacuum lifter comprising a cup including a bottom wall and a lip, a sealing ring, means for holding an edge of the sealing ring hermetically against the lip, a plurality of radial segment means arranged free of restraint from one another, and spring means, independent of said radial segment means, for biasing said radial segment means individually in the direction from the bottom wall toward the lip against the sealing ring outside of said edge, the radial segment means distributing force exerted by the spring means uniformly onto the sealing ring, the radial segment means being able to deflect in the direction from the lip toward the bottom wall against the spring means biasing.

2. A vacuum lifter as claimed in claim 1, said radial segment means being provided as tongues on a backup ring, the backup ring having a continuous edge held against said sealing ring edge in the means for holding, the tongues resulting from slots extending from the edge opposite the continuous edge radially toward the continuous edge.

3. A vacuum lifter as claimed in claim 2, said sealing ring having a 1/16-inch thickness and consisting essentially of rubber-bonded asbestos fibers, said backup ring being steel of 1/32-inch thickness, said sealing ring including solid lubricant on its side facing in the direction from the bottom wall toward the lip.

4. A vacuum lifter as claimed in claim 1, wherein the means for holding includes a plate, said spring means being secured to said plate and bearing against said segment means whereby upon disassembly of the means for holding from the ring assembly the spring means remains with said plate.

5. A vacuum lifter as claimed in claim 1, said sealing ring including solid lubricant on its side facing in the direction from the bottom wall toward the lip.

6. A vacuum lifter as claimed in claim 1, said sealing ring consisting essentially of rubber-bonded asbestos fibers.

7. A vacuum lifter as claimed in claim 6, wherein the sealing ring has a thickness greater than 1/32-inch and less than ⅛-inch.

8. A vacuum lifter as claimed in claim 7, said sealing ring including solid lubricant on its side facing in the direction from the bottom wall toward the lip.

9. A vacuum lifter comprising a cup including a bottom wall and a lip, a sealing ring, means for holding an edge of the sealing ring hermetically against the lip, a plurality of radial segment means arranged free of restraint from one another, and spring means for biasing said radial segment means individually in the direction from the bottom wall toward the lip against the sealing ring outside of said edge, the radial segment means distributing force exerted by the spring means uniformly onto the sealing ring; said radial segment means being provided as tongues on a backup ring, the backup ring having a continuous edge held against said sealing ring edge in the means for holding, the tongues resulting from slots extending from the edge opposite the continuous edge radially toward the continuous edge; wherein the means for holding includes a plate, said spring means being secured to said plate and bearing against said segment means whereby upon disassembly of the means for holding from the ring assembly the spring means remains with said plate; wherein the spring means includes, bearing against each of said segment means, a rivet whose shank is slidingly lodged in a hole through said plate, the rivet shank end protruding from said hole means for preventing the shank end of said rivet from passing through said hole, and a helical spring coaxial with said shank and forcing the head of the rivet toward the segment means associated therewith.

* * * * *

UNITED STATES PATENT OFFICE
CERTIFICATE OF CORRECTION

Patent No. 3,863,969          Dated February 4, 1975

Inventor(s) Richard B. Weiss and D. Marshall Fox

It is certified that error appears in the above-identified patent and that said Letters Patent are hereby corrected as shown below:

Col. 1, line 29         After "means," insert --for biasing the radial segment means--.

Signed and sealed this 13th day of May 1975.

(SEAL)
Attest:

RUTH C. MASON
Attesting Officer

C. MARSHALL DANN
Commissioner of Patents
and Trademarks